United States Patent Office 3,848,031
Patented Nov. 12, 1974

3,848,031
O-ALKYL-O-CYCLOHEXYL - S - ALKYL-, HALO-ALKYL- OR ALKENYL-PHOSPHOROTHIOLATES
Shigeo Kishino, Yasuo Yamada, Yoshio Kurahashi, and Toyohiko Kume, Tokyo, Japan, assignors to Bayer Aktiengesellschaft, Leverkusen, Germany
No Drawing. Filed Aug. 16, 1972, Ser. No. 281,252
Claims priority, application Japan, Aug. 18, 1971, 46/62,276
Int. Cl. A01n 9/36; C07f 9/16
U.S. Cl. 260—956                      9 Claims

ABSTRACT OF THE DISCLOSURE

An organic O-alkyl-O-cyclohexyl-phosphorothiolate of the formula

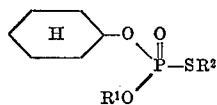
(I)

wherein $R^1$ is alkyl of 1 to 6 carbon atoms, and
$R^2$ is alkyl, haloalkyl or alkenyl of 1 to 6 carbon atoms, which possesses fungicidal and bactericidal activity.

---

The present invention relates to and has for its objects the provision of particular new O-alkyl-O-cyclohexyl-S-alkyl-, haloalkyl- or alkenyl-phosphorothiolates which possess fungicidal and bactericidal properties, active compositions in the form of mixtures of such compounds with solid and liquid dispersible carrier vehicles, and methods for producing such compounds in a new way especially for combating fungi and bacteria, with other and further objects becoming apparent from a study of the within specification and accompanying examples.

The specification of German Pat. No. 1,030,617 indicates that the compound of the formula

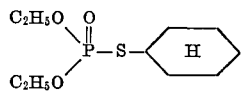

has insecticidal and acaricidal activity but no significant fungicidal activity.

The present invention provides organic phosphoric acid esters of the formula:

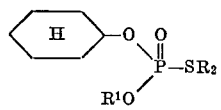
(I)

wherein $R^1$ is alkyl of 1 to 6 carbon atoms, and
$R^2$ is alkyl, haloalkyl or alkenyl of 1 to 6 carbon atoms.

Examples of $R^1$ in formula (I) include lower alkyl especially of up to 4 carbon atoms such as methyl, ethyl, n-propyl, iso-propyl, n-butyl, iso-butyl, sec-butyl and tert-butyl. Examples of $R^2$ include the alkl groups just mentioned, their halogenated derivatives such as 2-chloro-ethyl, 2-bromoethyl, 1-methyl-2-chloroethyl, 1-methyl-3-chloropropyl, 1-methyl-2-chloropropyl and 4-chlorobutyl, and their unsaturated counterparts such as allyl, propargyl and α-methallyl.

Surprisingly, the active compounds of this invention have an excellent fungicidal activity.

The invention also provides a process for the production of a compound of formula (I) in which
(a) a thiolphosphoryl chloride of the general formula

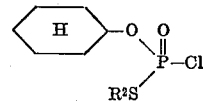
(II)

wherein $R^2$ is as defined above, is reacted with an alcohol or alcoholate of the general formula:

$$M^1OR^1 \qquad (III)$$

wherein $R^1$ is as defined above, and
$M^1$ stands for hydrogen or a metal, or (b) a thiophosphoric acid salt of the general formula

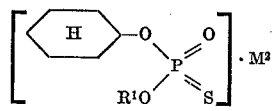
(IV)

wherein $R^1$ is as defined above, and
$M^2$ stands for an ammonium group or a metal, is reacted with a halide, alkyl sulfate or alkyl sulfonate of the general formula:

$$X \cdot R^2 \qquad (V)$$

wherein $R^2$ is as defined above, and
X is halogen or a residue of an alkylating agent such as a sulfuric acid ester or a sulfonic acid ester.

Process variant (a) is exemplified by the following reaction scheme:

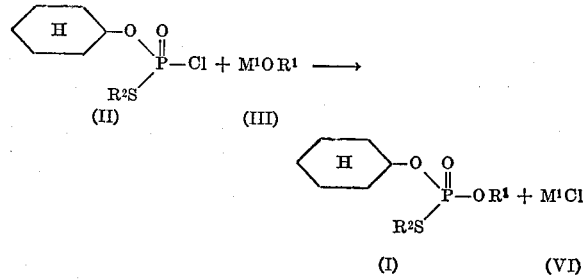

Examples of $M^1$ include hydrogen, sodium and potassium.

Examples of the thiolphosphoryl chlorides of formula (II) include S-methyl-O-cyclohexyl-thiolphosphoryl chloride, S-ethyl-O-cyclohexyl-thiolphosphoryl chloride, S-n-propyl-O-cyclohexyl-thiolphosphoryl chloride, S-iso-propyl-O-cyclohexyl - thiolphosphoryl chloride, S-n-butyl-O-cyclohexyl-thiolphosphoryl chloride, S-(2-chloroethyl)-O-cyclohexyl-thiolphosphoryl chloride and S-allyl-O-cyclohexyl-thiolphosphoryl chloride.

Examples of the alcohol or alcoholate of formula (III) include methyl alcohol, ethyl alcohol, n-propyl alcohol, iso-propyl alcohol, n-butyl alcohol, sec-butyl alcohol, and tert-butyl alcohol, and their sodium and potassium alcoholates.

The reaction is preferably conducted in a solvent or diluent. For this purpose any inert solvent or diluent may be used.

As examples of the solvent or diluent there may be cited water; aliphatic, alicyclic and aromatic hydrocarbons which may be chlorinated, such as hexane, cyclohexane, petroleum ether, ligroin, benzene, toluene, xylene, methylene chloride, chloroform, carbon tetrachloride, ethylene mono-, di- and tri-chloride, and chlorobenzene; ethers such as diethyl ether, methyl ethyl ether, iso-propyl ether, dibutyl ether, ethylene oxide, dioxane and tetrahydrofuran; ketones such as actone, methyl ethyl ketone, methyl isobutyl ketone and methyl isopropyl ketone; nitriles such as acetonitrile, propionitrile and acrylonitrile; alcohols such as methanol, ethanol, isopropanol, butanol and ethylene glycol; esters such as ethyl acetate and amyl acetate; acid amides such as dimethyl formamide and dimethyl acetamide; and sulfoxides and sulfones such as dimethyl sulfoxide and sulfolane.

The reaction of process variant (a) may be conducted in the presence of an acid binder. For this purpose, there may be used customary acid binders such as hydroxides, carbonates, bicarbonates and alcoholates of alkali metals, and tertiary amines, for example triethylamine, diethylaniline and pyridine.

When the reaction is effected in the absence of an acid binder, the intended product of high purity can be obtained in high yield by reacting the alcohol in the form of a salt, preferably an alkali metal salt, with the phosphoric acid diester monochloride.

Process variant (b) is exemplified by the following reaction scheme:

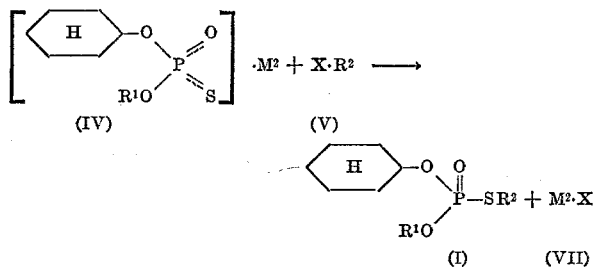

Examples of $M^2$ include sodium and potassium, and ammonium groups based on ammonia itself, triethyl amine, diethyl aniline and pyridine.

Examples of X are fluorine, chlorine, bromine and iodine, and residues of alkylating agents such as sulfuric acid esters and sulfonic acid esters.

Examples of the thiophosphoric acid salt of formula (IV) include ammonium O-methyl-O-cyclohexyl-thiophosphate, ammonium O - ethyl - O - cyclohexyl-thiophosphate, ammonium O-iso-propyl - O - cyclohexyl-thiophosphate, ammonium O-n-propyl - O - cyclohexyl-thiophosphate, and ammonium O-n-butyl - O - cyclohexyl-thiophosphate, and corresponding sodium and potassium salts.

Examples of the halide, alkyl sulfate or alkyl sulfonate of formula (V) include methyl chloride, ethyl chloride, n-propyl chloride, iso-propyl chloride, n-butyl chloride, 2-chloroethyl chloride and allyl chloride, and the corresponding bromides and iodides; dimethyl sulfate and diethyl sulfate; and methyl p-toluene-sulfonate.

By means of process variant (b), products of high purity can be obtained in good yield.

Preferably process variant (b) is carried out using an inert solvent or diluent such as recited above for process variant (a).

In each of the above variants, the reaction may be effected at temperatures within a broad range, but generally the reaction is carried out at about —20° C. to the boiling point of the reaction mixture, temperatures preferably ranging from about 0 up to 100° C. or up to the boiling point if below 100° C.

It is preferable that the reaction be conducted under atmospheric pressure but it is possible to conduct the reaction under reduced or elevated pressures.

The compounds of this invention exhibit highly lethal and growth-inhibiting activities against a wide variety of pathogenic bacteria and fungi, especially those causing diseases in plants. Accordingly, these compounds can be used for controlling diseases of plants caused by various bacteria and fungi.

More specifically, the compounds of this invention can be used effectively as fungicides against *Archimycetes, Phycomycetes, Ascomycetes, Basidiomycetes, Fungi Imperfecti* and other fungi as well as bacteria.

In particular, the compounds of this invention exhibit a very excellent controlling effect against bacteria and fungi causing diseases in rice plants such as *Piricularia oryzae* causing rice blast and *Pellicularia sasakii* causing rice sheath blight when they are applied to the surface of the water in which the rice grows, although their effect is much reduced if they are scattered in an ordinary application method. Accordingly, they may often be used for controlling these two pathogenic organisms at the same time. Surprisingly, these compounds have not only curative effects but also preventive effects, and the effects are very long-lasting, which increases their suitability for the concurrent control of these two organisms.

Further, the compounds of this invention can be applied for controlling pathogenic bacteria and fungi living in the above-ground portions of plants, pathogenic bacteria and fungi invading plants from the soil and causing tracheomycetes, seed-borne pathogenic bacteria and fungi, and soil-borne pathogenic bacteria and fungi.

By reason of the above-mentioned excellent fungicidal and bactericidal characteristics the compounds of this invention can be used very conveniently as agricultural and horticultural pesticides for controlling bacteria and fungi causing diseases in plants.

Moreover, since the compounds of this invention do not contain any harmful heavy metal such as mercury or arsenic, they do not cause a problem of residual toxicity in crops.

The active compounds according to the instant invention can be utilized, if desired, in the form of the usual formulations or compositions with conventional inert diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, ethylenechloride, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/ or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and bactericides, or insecticides, acaricides, rodenticides, nematocides, herbicides, fertilizers, growth-regulating agents, antivirus agents, and attractants (for instance organic phosphoric acid esters, carbamate compounds, dithio or thiol carbamate compounds, organic chlorine compounds, dinitro compounds, organosulfur or organometallic compounds, antibiotics, substituted diphenyl ethers, urea compounds and triazine compounds), and/or fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.005–10%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 3 to 1000 g./hectare, preferably 30 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. fungi and bacteria, which comprises applying to at least one of correspondingly (a) such fungi, (b) such bacteria, and (c) the corresponding habitat thereof, i.e. the locus to be protected, a correspondingly combative or toxic amount, i.e. a fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

A methanol solution of sodium methylate consisting of 2.3 g. of metallic sodium and 150 ml. of methanol was prepared, and 23 g. of O-cyclohexyl-S-methylthiophosphoryl chloride were added dropwise to the solution at −5° C. After completion of the dropwise addition, the mixture was agitated at room temperature for 4–5 hours, and methanol was distilled off under reduced pressure.

The residue was mixed with 150 ml. of benzene, agitated, washed with water, 2% sodium hydroxide solution and then with water, and dried over anhydrous sodium sulfate. Distillation of benzene gave 26 g. of O,S-dimethyl-O-cyclohexylphosphorothiolate characterized by a boiling point of 99° C. under 0.25 mm. Hg and a refractive index $n_D^{20}$ of 1.4917 and expressed by the following formula:

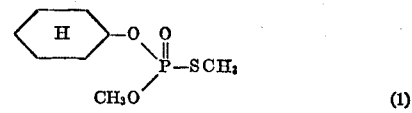

(1)

EXAMPLE 2

16.3 g. of triethylammonium O-ethyl-O-cyclohexylthiophosphate were dissolved in 50 ml. of ethyl alcohol, and 7.8 g. of ethyl iodide were added dropwise to the solution under agitation below 20° C. After completion of the dropwise addition, agitation was effected at 50° C. for 2–3 hours, and ethyl alcohol was distilled off under reduced pressure. 100 ml. of benzene were added to the residue, and the mixture was agitated, washed with water, 1% hydrochloric acid, 2% aqueous solution of sodium hydroxide and then with water again, and dried over anhydrous sodium sulfate. Distillation of benzene gave 15.1 g. of O,S-diethyl-O-cyclohexylphosphorothiolate characterized by a boiling point of 114° C. under 0.5 mm. Hg and a refractive index $n_D^{20}$ of 1.4857 and expressed by the following formula:

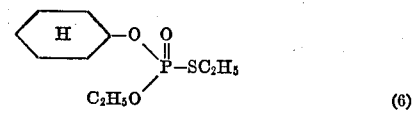

(6)

EXAMPLE 3

12.3 g. of sodium O-ethyl-O-cyclohexylthiophosphate were dissolved in 100 ml. of ethyl alcohol, and 6.3 g. of dimethyl sulfate were added to the solution. The mixture was agitated at 60° C. for 2.5 hours. The reaction mixture was filtered and the filtrate was condensed under reduced pressure. The condensate was incorporated with 100 ml. of benzene, washed with water, 2% aqueous solution of sodium hydroxide and then with water again, and dried over anhydrous sodium sulfate. Distillation of benzene gave 9.8 g. of O-ethyl-O-cyclohexyl-S-methyl-phosphorothiolate characterized by a boiling point of 115° C. under 0.6 mm. Hg and a refractive index $n_D^{20}$ of 1.4866 and expressed by the following formula:

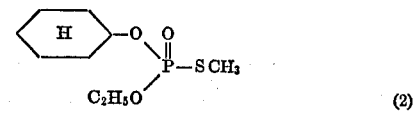

(2)

The compounds of Examples 1–3 and others synthesized by methods similar to those described in Examples 1–3 are listed in Table 1.

TABLE 1

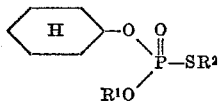

| Compound | R¹ | R² | Physical constants | |
|---|---|---|---|---|
| | | | Boiling point | $n_D^{20}$ |
| 1 | $CH_3$ | $CH_3$ | 99° C./0.25 mm. Hg | 1.4917 |
| 2 | $C_2H_5$ | $CH_3$ | 115° C./0.6 mm. Hg | 1.4866 |
| 3 | iso-$C_3H_7$ | $CH_3$ | 111° C./0.6 mm. Hg | 1.4820 |
| 4 | n-$C_4H_9$ | $CH_3$ | 128° C./0.5 mm. Hg | 1.4857 |
| 5 | $CH_3$ | $C_2H_5$ | 110–112° C./0.4 mm. Hg | 1.4883 |
| 6 | $C_2H_5$ | $C_2H_5$ | 114° C./0.5 mm. Hg | 1.4857 |
| 7 | n-$C_3H_7$ | $C_2H_5$ | 135° C./0.4 mm. Hg | 1.4858 |
| 8 | $C_2H_5$ | n-$C_3H_7$ | 128–130° C./0.1 mm. Hg | 1.4841 |
| 9 | $C_2H_5$ | iso-$C_3H_7$ | 118–120° C./0.7 mm. Hg | 1.4800 |
| 10 | $C_2H_5$ | n-$C_4H_9$ | 127–128° C./0.7 mm. Hg | 1.4814 |
| 11 | $C_2H_5$ | —$CH_2CH_2Cl$ | 137° C./0.55 mm. Hg | 1.4988 |
| 12 | $C_2H_5$ | —$CH_2CH_2Br$ | 135–139° C./0.4 mm. Hg | 1.5143 |
| 13 | $C_2H_5$ | —$CH_2CH=CH_2$ | 120° C./0.2 mm. Hg | 1.4922 |

EXAMPLE 4

(Wettable Powder)

15 parts of compound 3, 80 parts of a 1:5 mixture of diatomaceous earth and kaolin and 5 parts of an emulsifier ("Runnox," polyoxyethylene alkyl aryl ether) were ground and mixed together to form wettable powder. It was diluted with water to a concentration of 0.05% and applied to fungi and/or places where fungi grew.

EXAMPLE 5

(Emulsifiable Liquor)

30 parts of compound 2, 30 parts of xylene, 30 parts of "Kawakazol" (methylnaphthalene), and 10 parts of an emulsifier "Sorpol" (polyoxyethylene alkyl aryl ether) were mixed with stirring to form an emulsifiable liquor. It was diluted with water to 0.05% and sprayed on fungi and/or places where fungi grew.

EXAMPLE 6

(Dust)

2 parts of compound 6 and 98 parts of a 1:3 mixture of talc and clay were ground and mixed together to form dusts. They were scattered on fungi and/or places where fungi grow.

EXAMPLE 7

(Dust)

1.5 parts of compound 13, 0.5 part of iso-propyl hydrogen phosphate (PAP) and 96 parts of a 1:3 mixture of talc and clay were ground and mixed together to form dusts. They were scattered on fungi and/or places where fungi grew.

EXAMPLE 8

(Granule)

25 parts of water were added to a mixture of 10 parts of compound 5, 10 parts of bentonite, 78 parts of a 1:3 mixture of talc and clay and 2 parts of lignin sulfonate. The admixture was intimately blended and finely divided by means of an extruding granulator to yield granules of 20–40 mesh, followed by drying at 40–50° C. The resulting granules were sprayed on fungi and/or places where fungi grew.

EXAMPLE 9

(Granule)

95 parts of clay particles of a size distribution of 0.2–2 mm. were taken into a rotary mixer and a solution of 5 parts of compound 12 in an organic solvent was sprayed on the particles being rotated, thereby wetting the particles homogeneously. Then they were dried at 40–50° C. to form coated granules. They were sprayed on fungi and/or places where fungi grew.

EXAMPLE 10

(Oil Preparation)

0.5 part of compound 11, 20 parts of Versicoal AR–50 (methylnaphthalene) and 79.5 parts of Deobase (deodorized kerosene) were mixed with stirring to form an oil preparation. It was sprayed on fungi and/or places where fungi grew.

EXAMPLE 11

Test on effects on rice blast attained by injection of active compounds into water of paddy field (glass chamber test):

Preparation of Sample Chemicals

Solvent: 3.6 parts by weight of dimethyl formamide
Emulsifier: 0.15 part by weight of alkyl aryl polyglycol ether
Water: 96.25 parts by weight.

A concentrated emulsifiable liquor was obtained by mixing a given amount of the active compound with the above solvent and emulsifier, and it was diluted with the above amount of water to form a chemical sample.

Test Procedures

Soil of paddy field was packed in porcelain pots of 0.01 m.² and 5 stalks of paddy rice (Asahi variety) were cultivated per pot in the state filled with water in a depth of 1–2 cm., and at the 4- or 5-leaved stage, the chemical sample containing 0.08% of the active compound was injected into the water surface (while inhibiting the direct contact of the chemical with the rice plant) at a rate of 10 ml./pot with use of a pipette. This application rate corresponds to 800 grams of the active compound per 10 ares.

The thus treated paddy rice was infected with a suspension of spores of the pathogenic fungus of rice blast by spraying 4 days after the chemical treatment, and the infected paddy rice was kept for 24 hours in an inoculation chamber maintained at a temperature of 23–25° C. and a relative humidity of 100%. Then, the rice plant was transferred to a glass green house maintained at 20–28° C. and 8 days after the inoculation, the number of normal disease spots formed on a leaf was counted and compared with the number of disease spots formed on a leaf of the untreated rice plant. Then, the disease control ratio (percent) was calculated. At the same time, the phytotoxicity was observed with the naked eye. Results are shown in Table 1, where the symbol "—" indicated the absence of phytotoxicity.

TABLE 2

| Compound | No. of disease spots on one leaf | Disease control ratio (percent) | Photo-toxicity |
|---|---|---|---|
| 1 | 0 | 100 | — |
| 2 | 0 | 100 | — |
| 3 | 0 | 100 | — |
| 4 | 2.4 | 88 | — |
| 5 | 4.0 | 80 | — |
| 6 | 3.2 | 84 | — |
| 7 | 4.9 | 76 | — |
| 8 | 6.6 | 68 | — |
| 9 | 3.0 | 85 | — |
| 10 | 4.5 | 78 | — |
| 11 | 9.2 | 55 | — |
| 13 | 1.5 | 93 | — |
| Cerezin* (comparison) | 21.1 | 0 | — |
| EDDP** (commercially available comparison) | 17.5 | 14 | — |
| A*** (comparison) | 15.8 | 23 | — |
| Untreated control | 20.4 | 0 | |

*Cerezin=O-methyl-O-cyclohexyl-S-4-chlorophenyl phosphorothiolate
**EDDP=O-ethyl-S,S-diphenyl phosphorodithiolate.
***A=O,O-diethyl-S-cyclohexyl phosphorodithiolate, known from German Pat. 1,030,617.

EXAMPLE 12

Test on effects on rice blast attained by water-surface application of granules (glass chamber test):

Preparation of Sample Chemicals

A mixture having the following formulation was prepared:

Active compound, 15 parts by weight
Bentonite, 10 parts by weight
Zeeklite, 73 parts by weight
Lignin sulfonate, 2 parts by weight.

25 parts of water were added to the above mixture and it was kneaded. The kneaded mixture was finely divided by an extruding granulator to form granules of 20–40 mesh, which were then dried at 40–50° C.

Test Procedures

Paddy rice (Asahi variety) at the 4- or 5-leaves stage cultivated in the same manner as in Example 11 was treated with granules prepared according to the above method application rate of 53 mg. per pot. The granule was applied from the water surface. The above application rate of the chemical granule corresponds to 795 g. active compound per 10 ares and to 5.3 kg. granule per 10 ares.

Pathogenic fungi causing blast were inoculated artficially on the treated rice plant and cultured in the same manner as in Example 11. The effects and phytotoxicity were examined in the same manner as in Example 11. Results are shown in Table 3.

TABLE 3

| Compound | Active ingredient application rate (g./10 a.) | No. of disease spots on one leaf | Disease control ratio (percent) | Photo-toxicity |
|---|---|---|---|---|
| 3 | 795 | 0.8 | 96 | — |
| 6 | 795 | 2.3 | 88 | — |
| 13 | 795 | 1.7 | 90 | — |
| IBP* (commercially available comparison) | 800 | 5.2 | 72 | — |
| Untreated control | | 18.5 | 0 | — |

*IBP=O,O-di-ispropyl-S-benzylthiophosphate granule (active ingredient content of 17%).

EXAMPLE 13

Test on effects on rice sheath blight attained by injection of active compounds into water of paddy field (glass chamber test):

Preparation of Sample Chemicals 3.6 parts by weight of solvent (dimethyl formamide)
0.15 part by weight of emulsifier (alkyl aryl polyglycol ether)
96.25 parts by weight of water.

The above amounts of the solvent and emulsifier were mixed with a given amount of the active compound to form an emulsifiable concentrated liquor, which was then diluted with the above amount of water.

Test Procedures

Wagner pots of 1/5000 are were packed with paddy field soil, and 3 rice stalks (Kinmaze variety) were cultivated per pot in inundation conditions. At the primary tiller stage a diluted liquor containing the active compound at a concentration of 0.08%, which had been prepared according to the above method, was injected into the water surface by a pipette at a rate of 20 ml./pot.

Two days after the chemical treatment, the stem of the sample rice plant was infected with 3 g./pot of the pathogenic fungus of sheath blight cultured in a mixed culture medium of wheat bran, ground corn and polypeptone for 10 days. Then the sample rice plant was kept in an inoculation chamber maintained at a temperature of 28–30° C. and a relative humidity of more than 95% for 8 days. Then the degree of the disease was examined.

The damage degree was determined from the propagation of disease spots from the stem root based on the following standard.

$$\text{Damage degree} = \frac{3N_3 + 2N_2 + N_1 + 0N_0}{3N} \times 100$$

wherein

N=the total number of the stems examined
$N_0$=the number of the stems on which disease spots do not appear
$N_1$=the number of the stems in which disease spots extend to the first sheath
$N_2$=the number of the stems in which disease spots extend to the second sheath
$N_3$=the number of the stems in which disease spots extend to the third sheath.

Results are shown in Table 4.

TABLE 4

| Compound | Sheath blight damage degree | Phyto-toxicity |
|---|---|---|
| 2 | 14.2 | — |
| 5 | 5.0 | — |
| 6 | 10.8 | — |
| 11 | 3.3 | — |
| 12 | 5.3 | — |
| 13 | 8.3 | — |
| Cerezin (comparison) | 55.8 | — |
| IBP (commercially available comparison) | 26.4 | — |
| A (comparison) | 58.0 | — |
| Untreated control | 58.6 | |

It will be appreciated that the instant specification and examples are set forth by way of illustration and not limitation, and that various modifications and changes may be made without departing from the spirit and scope of the present invention.

What is claimed is:

1. An organic O-alkyl-O-cyclohexyl-phosphorothiolate of the formula:

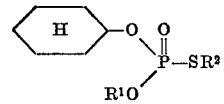

(I)

wherein $R^1$ is alkyl of 1 to 6 carbon atoms, and
$R^2$ is alkyl, haloalkyl or alkenyl of 1 to 6 carbon atoms, or propargyl.

2. A compound according to claim 1 wherein $R^1$ is alkyl of 1 to 4 carbon atoms and $R^2$ is alkyl, chloroalkyl or bromoalkyl of 1 to 4 carbon atoms, allyl, methallyl or propargyl.

3. The compound according to claim 1 wherein such compound is O,S-dimethyl-O-cyclohexylphosphorothiolate of the formula

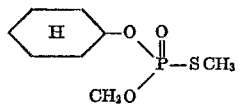     (1)

4. The compound according to claim 1 wherein such compound is O-ethyl-O-cyclohexyl-S-methyl-phosphorothiolate of the formula

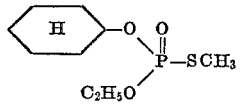     (2)

5. The compound according to claim 1 wherein such compound is O-isopropyl-O-cyclohexyl-S-methyl-phosphorothiolate of the formula

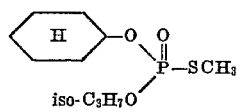     (3)

6. The compound according to claim 1 wherein such compound is O-butyl-O-cyclohexyl-S-methyl-phosphorothiolate of the formula

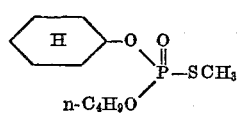     (4)

7. The compound according to claim 1 wherein such compound is O-methyl-O-cyclohexyl-S-ethyl-phosphorothiolate of the formula

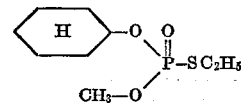     (5)

8. The compound according to claim 1 wherein such compound is O,S-diethyl-O-cyclohexylphosphorothiolate of the formula

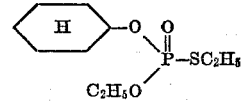     (6)

9. The compound according to claim 1 wherein such compound is O-ethyl-O-cyclohexyl-S-allyl-phosphorothiolate of the formula

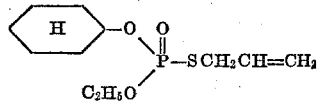     (13)

References Cited
UNITED STATES PATENTS

| | | | |
|---|---|---|---|
| 2,690,451 | 9/1954 | Gilbert et al. | 260—958 X |
| 3,294,874 | 12/1966 | Schrader | 260—958 X |

ANTON H. SUTTO, Primary Examiner

U.S. Cl. X.R.

260—958, 979; 424—219, 225

UNITED STATES PATENT OFFICE
CERTIFICATE OF CORRECTION

Patent No. 3,848,031      Dated November 12, 1974

Inventor(s) Shigeo Kishino et al

It is certified that error appears in the above-identified patent and that said Letters Patent are hereby corrected as shown below:

Col. 11, Claim 3, in the structural formula, cancel "$CH_2O$" and substitute therefor -- $CH_3O$ --.

Signed and Sealed this ninth Day of September 1975

[SEAL]

Attest:

RUTH C. MASON
*Attesting Officer*

C. MARSHALL DANN
*Commissioner of Patents and Trademarks*